United States Patent Office 3,658,793
Patented Apr. 25, 1972

---

3,658,793
6-AMINO-5-AZA- AND -5,7-DIAZA-AZULENES AND PROCESS FOR THE PRODUCTION THEREOF
Klaus Hafner, Darmstadt, Germany, and Ulrich Muller-Westerhoff, Berkeley, Calif., assignors to Studiengesellschaft Kohle m.b.H., Mulheim an der Ruhr, Germany
No Drawing. Filed July 18, 1968, Ser. No. 745,704
Claims priority, application Germany, July 31, 1967,
P 16 95 864.8
Int. Cl. C07d *41/08, 53/02*
U.S. Cl. 260—239 BB    9 Claims

---

ABSTRACT OF THE DISCLOSURE

The present invention refers to anti-inflammatory 6-amino-5-azo and 6-amino-5,7-diaza-azulene of the general formula

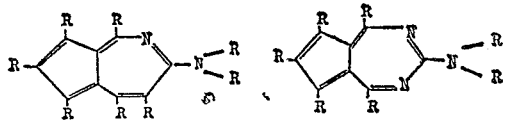

and, in particular, to a simple process for the production thereof.

---

While processes for the production of heterocyclic azulenes having one or several nitrogen atoms in the 5-membered ring, have been described already (W. Keller-Schierlein and E. Heilbronner in Non-Benzenoid Aromatic Compounds, D. Ginsberg, ed.; Interscience N.Y. 1959, p. 317), aza-azulenes having nitrogen atoms in the 7-membered ring of the bicyclic compound have been investigated up to now only rarely. Only two members of this class of compounds have become known up to now. W. Treibs and W. Schroth (Liebigs Ann. Chem., vol. 642 (1961), p. 108) synthesized the 1,2*6,7-dibenzo-3-cyano-4-aza-azulene (I) and K. Hafner and M. Kreuder (Angew. Chem., vol 73 (1961 p. 657), synthesized the 5-aza-azulene (II).

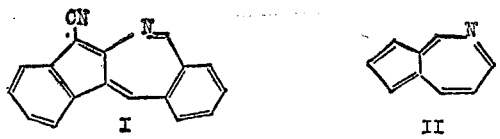

While it was only possible to produce compound I in low yields by way of a multistep synthesis (reaction Equation I), compound II has been prepared by ring-forming condensation of the sodium salt of 6-hydroxy-fulvene-2-propene-1'-al-3' (III) with ammonia.

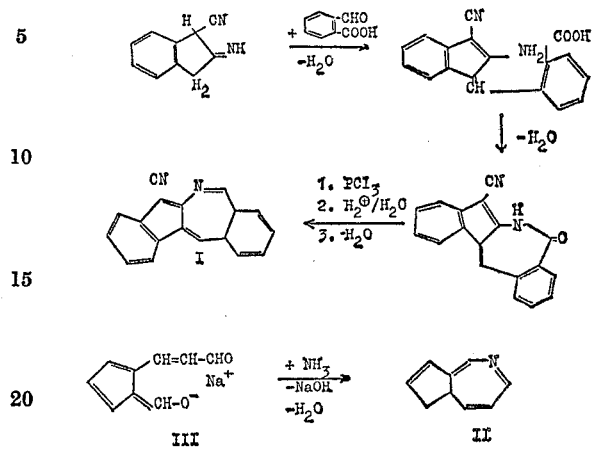

Both processes start from compounds which are not readily available and the synthesis of which necessitates a multistep process. Furthermore, both synthesis cannot be used for the production of aza-azulenes having functional groups in the 7-membered nitrogen containing ring.

Aza-azulenes having one or several nitrogen atoms in the 7-membered ring of the bicyclic compound as well as their functionally substituted derivatives are of particular interest in view of numerous azepine and diazepine derivatives recently described as highly effective psychopharmaceuticals. They furthermore exert an anti-influammatory effectiveness and, therefore, are useful as anti-inflammatory agent, for instance as active ingredient in ointments, gargles, drops and the like.

It is an object of the present invention to provide new 5-aza- or, respectively, 5,7-diaza-azulenes having an amino group in the position 6.

Another object of the present invention is to provide a new process by which 5-aza- or, respectively, 5,7-diaza-azulenes having an amino group in position 6 may be produced readily and in a simple manner.

Further objects of the present invention and advantages thereof will become apparent to those skilled in the art as the following description proceeds.

1,2-diacylated cyclopentadienes IV, their aldimmonium or respectively, ketimmonium salts V as well as their amino-fulvene derivatives VI (the production of which is described in German patent specifications 1,104,955 and 1,105,411)

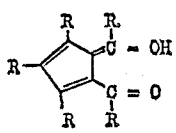  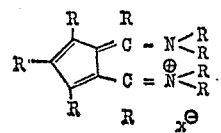  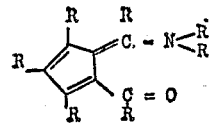

undergo reaction when being heated with amidines or amidinium salts of aliphatic carboxylic acids the α-positioned methylene group of which being unsubstituted, upon heating in the presence or absence of a solvent. This reaction yields in a double condensation and in the production of 6-amino-5-aza-azulenes of the class characterized by the Formula VIII. Both starting products are used in a mole ratio of 1:1. It is assumed that the 1,2-diacyl cyclopentadiene or its aldimmonium or, respectively, ketimmonium salt or the corresponding 6-amino-fulvene acylated in the position 2 undergoes reaction with the amidine thus yielding into the intermediate compound of Formula VII which then is converted into the corresponding 6-amino-5-aza-azulene VIII by ring-producing condensation.

group which may be substituted with a halogen atom, preferably a chlorine or bromine atom, or with a hydroxy, lower alkoxy, amino, mono-lower alkoxy-amino or di-lower alkoxy-amino group, and/or a phenyl lower alkyl group the phenyl group of which is possibly substituted with a halogen atom, preferably a chlorine or bromine atom, or with a hydroxy, lower alkoxy, amino, mono-lower alkoxy-amino or di-lower alkylamino group. Most preferably, R, R' and R" represent hydrogen, a lower alkyl group having from 1 to 4 carbon atoms, the phenyl group or a phenyl lower alkyl group having from 1 to 4 carbon atoms in the alkyl group. Such lower alkyl groups are methyl, ethyl, propyl, isopropyl, butyl, sec.-butyl and tert.-butyl. Such phenyl lower alkyl groups are benzyl, beta-phenyl ethyl.

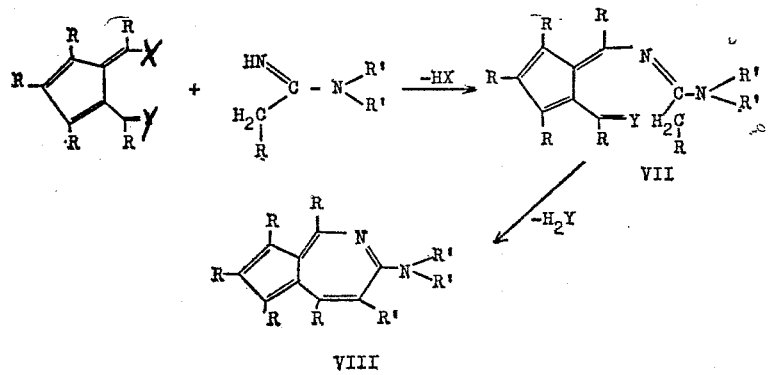

In an analogous manner, 1,2-diacyl cyclopentadienes or their aldimmonium or ketimmonium salts as well as 2-acyl-6-amino fulvenes may be reacted with guanidine or its N,N-dialkyl, N,N-diaryl or N-aralkyl derivatives or the corresponding guanidinium salts, at an elevated temperature in the presence or absence of a solvent to yield 6-amino-5,7-diaza-azulenes X. This reaction is carried out in an analogous manner. The synthesis of compound X, too, is assumed to proceed by two steps with the intermediary formation of compounds of the general Formula IX which are converted into X by ring-forming condensation.

The 6-amino-5-aza- and 6-amino-5,7-diaza-azulenes of the present invention may also be represented by one general formula, namely

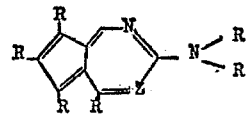

Z being =N— or

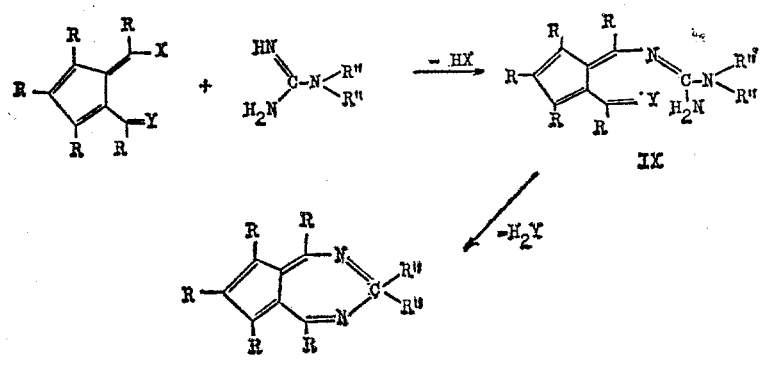

In Formulas VI to VII, R, R' and R", which may be the same or different, represent hydrogen, alkyl, aryl or aralkyl groups, X represents a hydroxyl, alkoxy, preferably lower alkoxy with 1 to 4 carbon atoms, or an amino group or —NR₂ or —NHR, and Y represents —O—, —NH—, —NR—, —⁺NH₂— or —⁺NR₃—

Preferably, R, R' and R" represent hydrogen, a lower alkyl group having from 1 to 4 carbon atoms, the phenyl and R having the same meaning as given hereinabove.

And the amidine, amidinium, guanidine and guanidinium derivatives started from in the present process may be represented by the formula

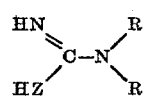

and, respectively,

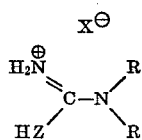

R, Z, and X having the same meaning as indicated hereinabove.

The present invention is further illustrated by the following examples which are not limitative.

EXAMPLE 1

A well triturated mixture of 2.1 g. (10 millimols) of 6-dimethylamino-fulvene - 2 - (N,N-diethylaldimmonium)-chloride and 1.2 g. (10 millimols) of N,N-dimethyl acetamidine hydrochloride is heated at a vacuum of 1 torr in a 100 cc. flask connected with a trap cooled to −60° C. by means of a short tube. An orange-yellow colored product distills which is recovered and subjected to chromatographic purification on aluminum oxide (basic, activity II) in ether, thus producing 210 mg. (12.2% of the theoretical) of 6-dimethylamino-5-aza-azulene melting at 99° C. The identity of the product is established by elementary analysis, molecular weight determination as well as infrared and NMR spectrum.

Elementary analysis.—Calcd. for $C_{11}H_{12}N_2$ (percent): (M.W. 172.24). C, 76.71; H, 7.02; N, 16.27. Found (percent): C, 76.67; H, 7.09; N, 16.06. Molecular weight found: 171.

The picrate of 6-dimethylamino-5-aza-azulene

A solution of 65.0 mg. (0.28 millimol) of picric acid in 30 cc. of methanol are added to a solution of 50.0 mg. (0.29 millimol) of 6-dimethylamino-5-aza-azulene. The picrate separating at −50° C., is recrystallized from methanol. Thus 95.5 mg. (85% of the theoretical calculated to the picric acid started from) are obtained as yellow crystals which slowly decompose starting at 180° C.

Elementary analysis.—Calcd. for $C_{12}H_{15}O_7$ (percent): (M.W. 401.35) C, 50.87; H, 3.77; N, 17.45. Found (percent): C, 50.96; H, 3.77; N, 17.42.

EXAMPLE 2

1.5 g. (10 millimols) of 6-dimethylamino-fulvene-2-aldehyde and 1.2 g. (10 millimols) of N,N-dimethyl-acetamidinehydrochloride are slowly heated on an oil bath in a 100 cc. flask closed with a calcium chloride tube. A clear melt is obtained at 90° C. which slowly turns dark. The melt is heated for two hours at 120° C., the cooled reaction product is dissolved in methanol and this solution is poured into 250 cc. of water. The aqueous mixture is extracted 5 times with ether. The combined ether extracts are washed with water and dried over anhydrous magnesium sulfate. After separation of the solvent in a vacuum, a brownish residue is obtained which is subjected to chromatographic purification on aluminum oxide (basic, activity II) in ether. Thus, 0.7 g. (41% of the theoretical) of 6-dimethylamino-5-aza-azulene are obtained as needles melting at 99° C. This product is identical with the product obtained according to Example 1.

EXAMPLE 3

2.1 g. (10 millimols) of 6-dimethylamino-fulvene-2-(N,N-dimethyl-aldimmonium)-chloride together with 0.9 g. (10 millimols) of N,N-dimethyl guanidine in 100 cc. of anhydrous methanol are refluxed for 15 minutes. The yellow reaction solution is reduced to half of its volume and is poured into 200 cc. of water. This aqueous solution is extracted three times with ether, thus yielding into a deeply yellow colored ethereal solution. This solution is dried over calcinated sodium sulfate and the solvent is distilled off in a vacuum. Thus, 600 mg. of a mixture of products are obtained which is subjected to chromatography on aluminum oxide (basic, activity II) in ether. The product thus may be separated into a first deeply yellow zone and a second light-yellow zone. The eluate of the first zone is evaporated in a vacuum, thus producing 300 mg. of crystals melting at 80° C. Infrared analysis and the melting point analysis after mixing with the assumed compound shows that this product is 6-dimethylamino-fulvene-2-aldehyde. The second eluate is subjected to NMR spectral analysis and elementary analysis as well as determination of the molecular weight. This crystalline product melting at 103° shows to be 6-dimethylamino-5,7-diaza-azulene. The yield in 6-dimethylamino-5,7-diaza-azulene amounts to 14.5% of the theoretical. The 6-dimethylamino-fulvene-2-aldehyde is obtained in a yield of 20% of the theoretical.

Elementary analysis.—Calcd. for $C_{10}H_{11}N_3$ (percent): (M.W. 173.22) C, 69.34; H, 6.40; N, 24.26. Found (percent): C, 69.53; H, 6.55; N, 23.97. Molecular weight found: 170.

The picrate of 6-dimethylamino-5,7-diaza-azulene

A solution of 59.0 mg. (0.23 millimol) of picric acid in 30 cc. of methanol are added to a solution of 45.4 mg. (0.26 millimol) of 6-dimethylamino-5,7-diaza-azulene in 30 ml. of methanol. After standing for a short period of time, yellow needles are precipitated. Even upon recrystallization from methanol, this product does not show a sharp melting or decomposition point. On the contrary, it slowly decomposes with discoloration starting from 170° C. The yield amounts to 76 mg. (83% of the theoretical calculated to the amount of picric acid started from).

Elementary analysis.—Calcd. for $C_{16}H_{14}N_6O_7$ (percent): (M.W. 402.34) C, 47.76; H, 3.51; N, 20.89. Found (percent): C, 47.84; H, 3.51; N, 20.86.

EXAMPLE 4

3.2 g. (21.5 millimols) of 6-dimethylamino-fulvene-2-aldehyde and 2.0 g. (23 millimols) of N,N-dimethyl guanidine are dissolved in 60 ml. of anhydrous methanol and this solution is refluxed for 30 minutes. Upon removal of the solvent in a vacuum and chromatographic purification of the semi-solid residue on aluminum oxide (basic, activity II) in ether, 1.2 g. of 6-dimethylamino-5,7-diaza-azulene is recovered from the first zone on the aluminum oxide column. Upon recrystallization from petrol ether twice, the resulting yellow plates melt at 103° C. Infrared and NMR spectrums correspond to those obtained with the product of Example 3. The second zone of the chromatographic column produces 1.1 g. of 6-dimethylamino-fulvene-2-aldehyde. The yield in 6-dimethylamino-5,7-diaza-azulene corresponds to 49% of the theoretical, calculated to the amount of 6-dimethylamino-fulvene-2-aldehyde converted.

What we claim is:

1. The process for the production of 6-amino-5-aza-azulenes of the formula

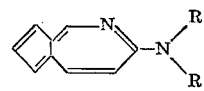

wherein R represents a member selected from the group consisting of hydrogen and a 1–4 carbon atom alkyl group comprising reacting at an elevated temperature a 1,2-diacyl-cyclopentadiene derivative of the formula

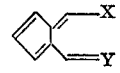

wherein X is a member selected from the group consisting of hydroxy, alkoxy and

where R is defined as above, and Y is a member selected from the group consisting of oxygen,

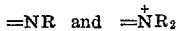

where R is defined as above, with a compound selected from the group consisting of amidines of the formula

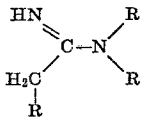

and amidinium derivatives of the formula

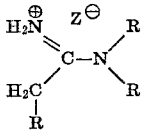

wherein R is as defined above and $Z^\ominus$ is a member selected from the group consisting of chloride, bromide, iodide, perchlorate and fluoroborate.

2. The process as defined by claim 1, wherein the reaction is carried out in the presence of an inert organic solvent.

3. The process as defined by claim 1, wherein the reaction is carried out at a temperature between 30 and 150° C.

4. The process for the production of 6-amino-5,7-diaza-azulenes of the formula

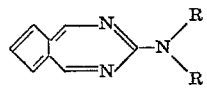

wherein R represents a member selected from the group consisting of hydrogen and a 1–4 carbon atom alkyl group comprising reacting at an elevated temperature a 1,2-diacyl-cyclopentadiene derivative of the formula

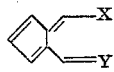

wherein X is a member selected from the group consisting of hydroxy, alkoxy and

where R is defined as above, and Y is a member selected from the group consisting of oxygen,

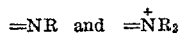

where R is defined as above, with a compound selected from the group consisting of guanidines of the formula

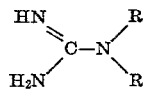

and guanidinium derivatives of the formula

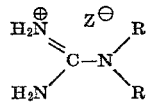

wherein R is as defined above and $Z^\ominus$ is a member selected from the group consisting of chloride, bromide, iodide, perchlorate and fluoroborate.

5. The process as defined by claim 4, wherein the reaction is carried out in the presence of an inert organic solvent.

6. The process as defined by claim 4, wherein the reaction is carried out at a temperature between 30 and 150° C.

7. Compounds of the formula

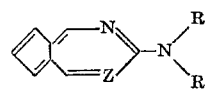

wherein Z is =N— or =CH— and R are members selected from the group consisting of hydrogen and a 1–4 carbon atom alkyl group.

8. Compounds as defined by claim 7 wherein Z is =N— and R is methyl.

9. Compounds as defined by claim 7 wherein Z is =CH— and R is methyl.

References Cited

FOREIGN PATENTS 1,104,955  7/1966  Germany.
1,105,411  11/1961  Germany.

OTHER REFERENCES

Müller-Westerhoff et al.: Tetrahedron Letters, No. 44, pages 4341–4346 (1967).

ALTON D. ROLLINS, Primary Examiner

U.S. Cl. X.R.

260—239 BD, 564 R; 424—244